(12) United States Patent
Göras et al.

(10) Patent No.: US 7,963,187 B2
(45) Date of Patent: Jun. 21, 2011

(54) CONTROL ARRANGEMENT AND GEARBOX

(75) Inventors: Erik Göras, Solna (SE); Magnus Hagberg, Södertälje (SE)

(73) Assignee: Scania CV AB (publ) (SE)

( * ) Notice: Subject to any disclaimer, the term of this patent is extended or adjusted under 35 U.S.C. 154(b) by 344 days.

(21) Appl. No.: 12/298,393

(22) PCT Filed: Apr. 11, 2007

(86) PCT No.: PCT/SE2007/050234
§ 371 (c)(1),
(2), (4) Date: Nov. 3, 2008

(87) PCT Pub. No.: WO2007/123478
PCT Pub. Date: Nov. 1, 2007

(65) Prior Publication Data
US 2009/0095107 A1     Apr. 16, 2009

(30) Foreign Application Priority Data

Apr. 26, 2006  (SE) ...................... 0600905

(51) Int. Cl.
*G05G 5/08*     (2006.01)
(52) U.S. Cl. .................................... 74/473.26
(58) Field of Classification Search ............... 74/473.21, 74/473.26, 473.24, 473.25, 473.28; 267/2, 267/36.1, 265
See application file for complete search history.

(56) References Cited

U.S. PATENT DOCUMENTS

| 4,070,914 A * | 1/1978 | Reinhardt et al. ......... 74/473.11 |
| 4,193,316 A | 3/1980 | Kelbel |
| 4,543,846 A * | 10/1985 | Inui et al. .................. 74/473.24 |
| 4,569,247 A | 2/1986 | Inui et al. |
| 5,121,650 A | 6/1992 | Wilhelmy et al. |
| 6,668,676 B2 * | 12/2003 | Koyama et al. ............ 74/473.28 |

OTHER PUBLICATIONS

International Search Report dated Jun. 14, 2007, issued in corresponding international application No. PCT/SE2007/050234.

* cited by examiner

*Primary Examiner* — Vicky A Johnson
(74) *Attorney, Agent, or Firm* — Ostrolenk Faber LLP

(57) ABSTRACT

The invention relates to a control device for controlling the engagement of desired gears of a gearbox, which control device comprises a control rod with a relating locking arrangement. The locking arrangement comprises a locking element provided with one or more grooves or recesses which each define a predetermined setting position of the control rod. The locking arrangement further comprises a resilient locking means arranged in a recess in the control rod, which locking means has a locking portion which, against the action of a spring force of the locking means, is arranged for movement in said recess in the control rod's radial direction between a protruded position in which the locking portion engages in one of said grooves/recesses in the locking element and thereby counteracts movement of the control rod relative to the locking element, and a retracted position in which the locking portion does not engage in any of said grooves/recesses in the locking element. The invention also relates to a gearbox comprising such a control device.

9 Claims, 3 Drawing Sheets

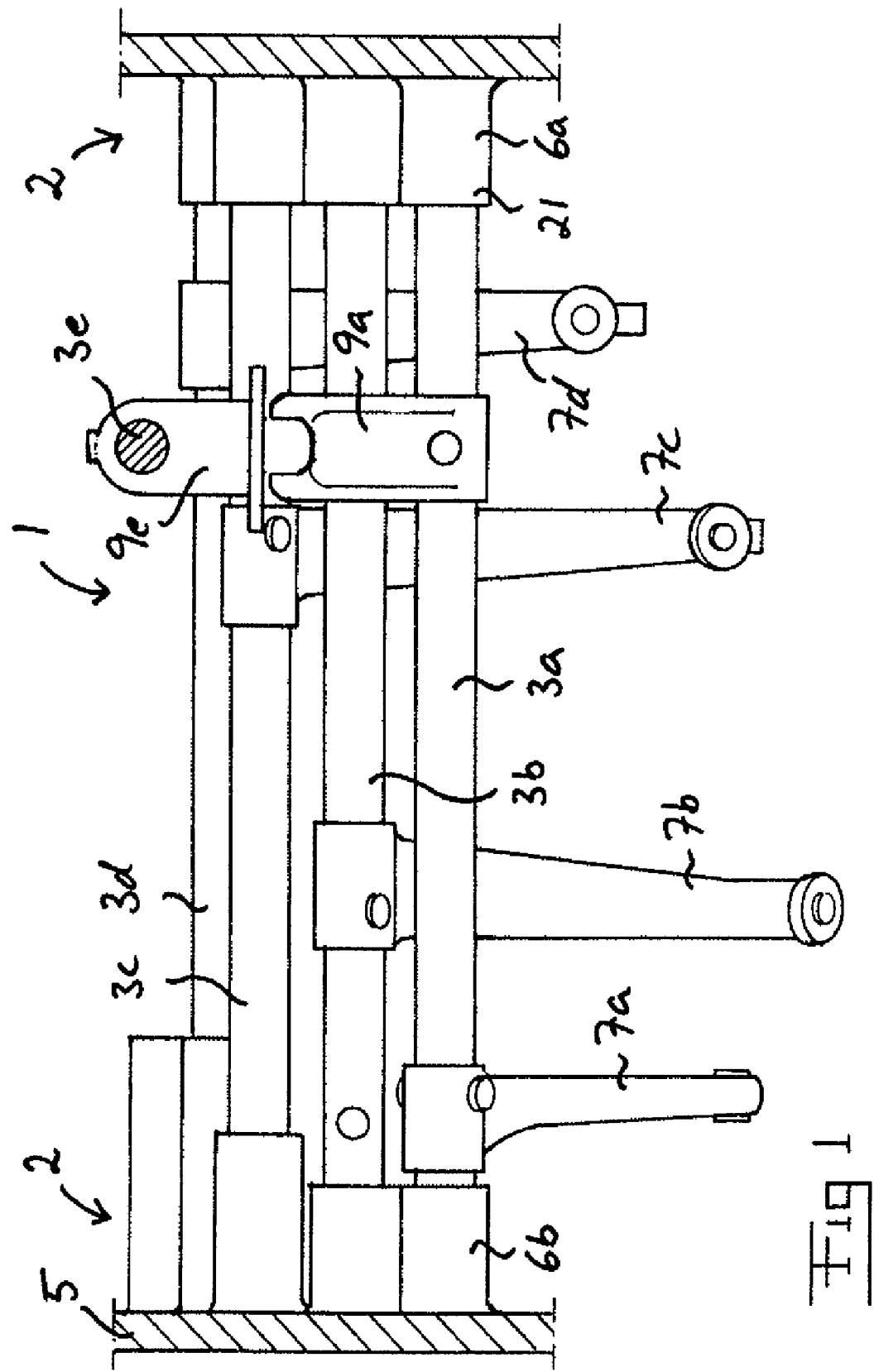

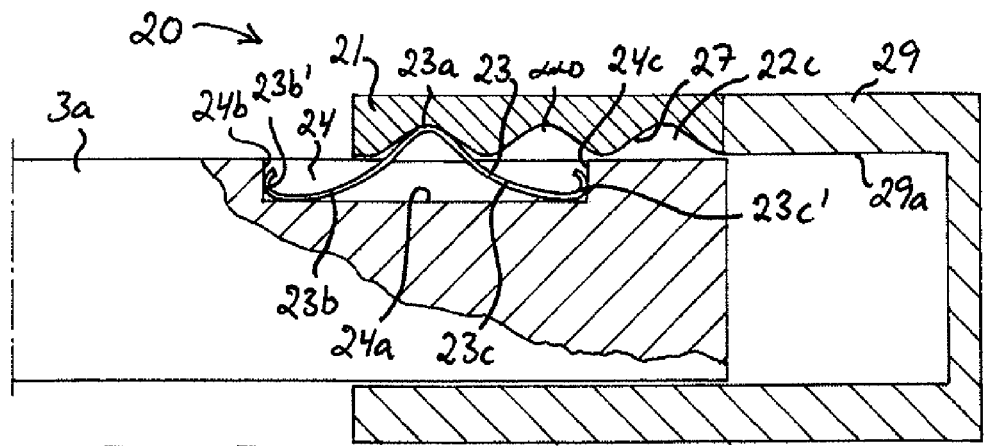
Fig 2a
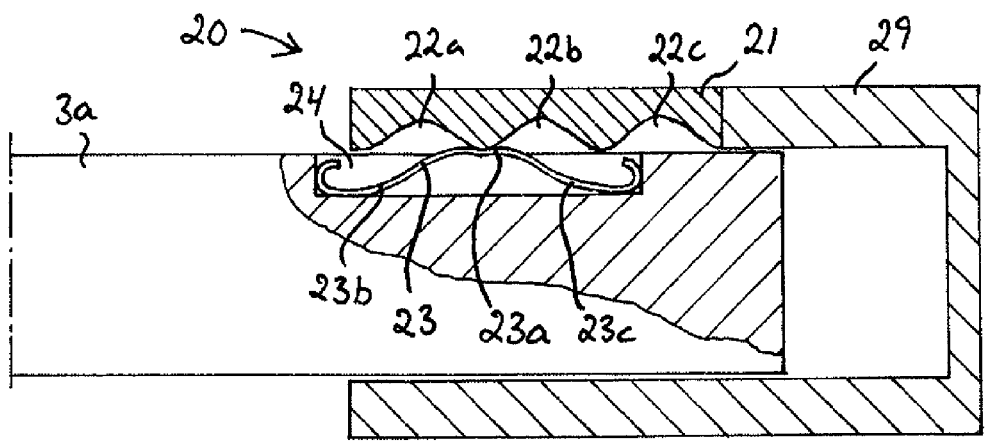
Fig 2b
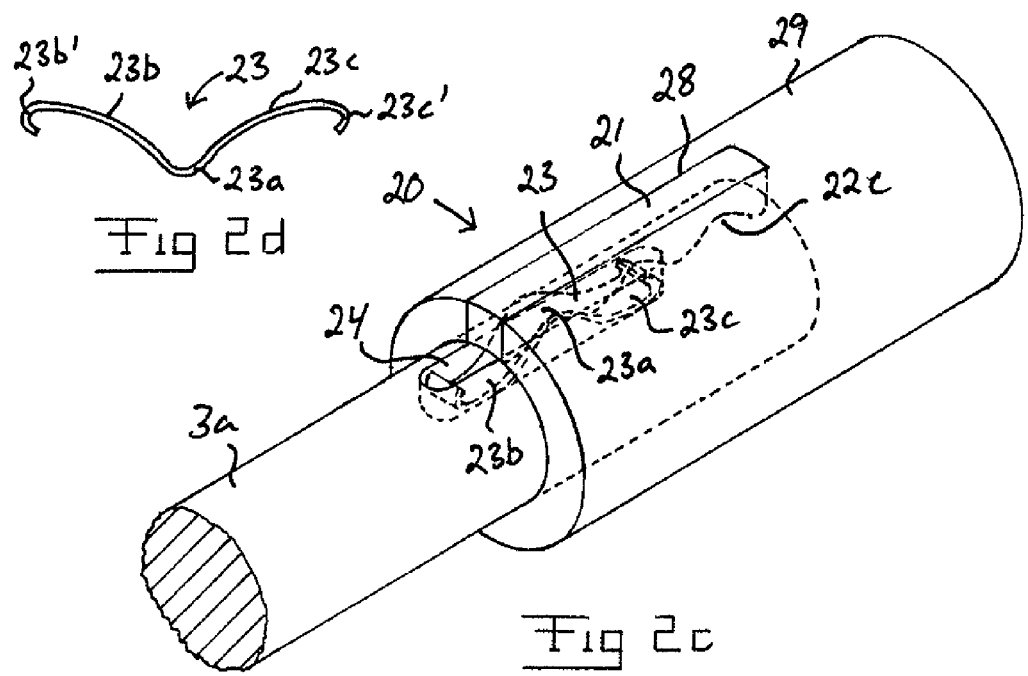
Fig 2d
Fig 2c

ND GEARBOX

CROSS REFERENCE TO RELATED APPLICATION

The present application is a 35 U.S.C. §§371 national phase conversion of PCT/SE2007/050234, filed 11 Apr. 2007, which claims priority of Swedish Application No. 0600905-4, filed 26 Apr. 2006 incorporated herein by reference. The PCT International Application was published in the English language.

FIELD OF THE INVENTION AND STATE OF THE ART

The present invention relates to a control device associated with a control rod of a gearbox of a vehicle and to a gearbox comprising such a control rod.

In a manual gearbox of a motor vehicle, e.g. a passenger car, a truck, a tractor vehicle for semitrailers or a bus, the engagement of desired gears is usually controlled by a control device which forms part of the gearbox and is provided with a plurality of control rods. These control rods can, by operation of the vehicle's gear lever, be moved between various predetermined setting positions which define the various gear positions of the gearbox. Each control rod cooperates with a locking arrangement which ensures that the control rod will assume one of the predetermined setting positions in response to movement of the gear lever and that the control rod is not unintentionally shifted from the relevant setting position. EP 0 702 172 A1 refers to a conventional type of locking arrangement for a control rod of a gearbox. This locking arrangement comprises a locking means which, through the action of a spring means, is adapted to engaging in various recesses of the control rod. Each of these recesses corresponds to a predetermined setting position of the control rod. Each recess has a guide surface adapted to cooperating with the locking means in such a way that the locking means, through the action of this guide surface and against the action of the spring means, will move from a protruded position to a retracted position in response to an axial movement of the control rod starting from a setting position of the control rod with the locking means engaged in the respective recess. Changing from one setting position to another thus entails the control device being moved in its longitudinal direction with sufficient force to overcome the spring force from the spring means which, via the locking means, counteracts such movement. When the control rod has been moved so far that another of these recesses arrives in way of the locking means, the locking means will, through the action of the spring means, move forward to engage with that recess and thereby counteract further movement of the control rod. By means of these locking functions, the person operating the gear lever receives via the respective control rod and the gear lever a perception of the various gear positions.

OBJECT OF THE INVENTION

The object of the invention is to provide a further development of a control device of the type indicated above in order to propose a configuration which in at least some respects affords an advantage as compared with a conventionally configured control device.

SUMMARY OF THE INVENTION

According to the present invention, said object is achieved by means of a control device having the features disclosed herein.

According to the invention, the control device comprises at least one control rod with a relating locking arrangement, which locking arrangement comprises a locking element provided with one or more grooves or recesses which each define a predetermined setting position of the control rod, whereby the control rod is arranged for movement relative to the locking element. The locking arrangement further comprises a resilient locking part arranged in a recess in the control rod, which locking part has a locking portion which, against the action of a spring force of the locking part, is arranged for movement in said recess in the control rod's radial direction between a protruded position in which the locking portion engages in one of said grooves/recesses in the locking element and thereby resists movement of the control rod relative to the locking element, and a retracted position in which the locking portion does not engage in any of said grooves/recesses in the locking element.

According to the invention, the locking part is thus arranged in the actual control rod, thereby rendering the locking arrangement particularly space-saving. The solution according to the invention also makes simplified construction of the control device possible as compared with the conventional solution described above, thus providing the possibility of reduced manufacturing costs. For example, the locking arrangement need not comprise any separate spring acting upon the locking part, since the locking part itself is inherently resilient.

According to a preferred embodiment of the invention, the locking part takes the form of a leaf spring, making it possible for the locking part to be manufactured easily and at low cost.

According to another embodiment of the invention, the locking part sits loosely in a related recess in the control rod. this provides an advantage that the locking part, by abutment against side surfaces of the related recess in the control rod, is prevented from moving in the control rod's longitudinal direction and circumferential direction. Need for special fastening for fitting the locking part in the control rod's recess is thus eliminated, making it possible for the locking arrangement to comprise a small number of components of simple configuration and at the same time to be particularly easy to fit.

The invention also relates to a gearbox, preferably in the form of a manual gearbox for a motor vehicle, comprising a control device according to the present invention.

BRIEF DESCRIPTION OF THE DRAWINGS

The invention is described below in more detail on the basis of embodiment examples with reference to the attached drawings, in which:

FIG. 1 depicts a schematic side view of control rods forming part of a control device according to the present invention, FIG. 2a depicts a schematic partly cutaway side view of part of a control rod with a relating locking arrangement shown in a locking position, FIG. 2b depicts the side view according to FIG. 2a with the locking arrangement shown in a non-locking position, FIG. 2c depicts a schematic perspective view of the control rod and the locking arrangement according to FIGS. 2a and 2b, FIG. 2d depicts a schematic side view of a locking part forming part of the locking arrangement according to FIGS. 2a-2c.

DETAILED DESCRIPTION OF PREFERRED EMBODIMENTS

The control device 1 according to the invention is intended to form part of a gearbox in order to control the engagement of desired gears of the gearbox. Apart from the locking arrangements described below, the control device and the relating gearbox may be of conventional and known configuration.

Figure 3:
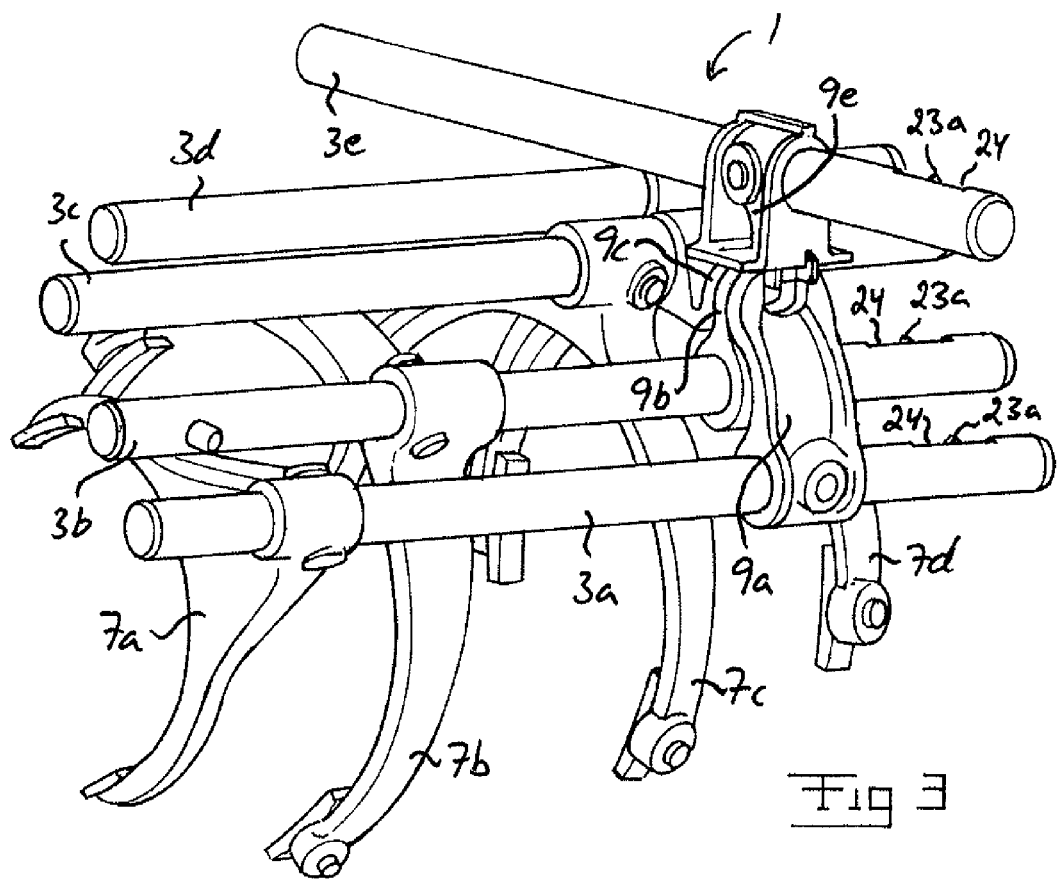
FIG. 3 depicts a schematic perspective view of the control rods according to FIG. 1.

FIGS. 1 and 3 illustrate four control rods 3a-3d arranged for linear movement in a holder unit 2 and forming part of a control device 1 according to the present invention. In FIG. 3, the holder unit is omitted for the sake of clarity. The number of control rods of the control device according to the invention may be both larger or smaller than here illustrated. The holder unit 2 may be integrated in the housing 5 of the relating gearbox, as schematically illustrated in FIG. 1. Each control rod 3a-3d is supported for movement relative to the holder unit 2 in such a way that relative to the holder unit it is movable in its longitudinal direction. Each control rod 3a-3d may be supported relative to the holder unit 2 via, for example, a plain bearing 6a, 6b at each end of the control rod, as illustrated in FIG. 1. Each control rod 3a-3d is connected in a known manner to a gear lever by means of which the control rod 3a-3d can be caused to move relative to the holder unit 2. By operating the gear lever between various predetermined positions, the user, e.g. a driver in a motor vehicle, can place the control rods 3a-3d in desired setting positions relative to the holder unit 2. Each control rod 3a-3d effects in a known manner not here described, via a selector fork 7a-7d, the engagement and disengagement of various predetermined gears of the gearbox. Each selector fork 7a-7d moves together with the relating control rod 3a-3d and acts upon the gear position of the gearbox via a known and not here illustrated control mechanism of the gearbox. Each control rod effects the engagement and disengagement of two different gears of the gearbox. From a neutral position, each control rod 3a-3d can be moved longitudinally in one direction to a predetermined setting position to engage a first of said two gears and in another direction to another predetermined setting position to engage the second of said two gears.

Of the aforesaid control rods, three control rods 3a-3c in the example illustrated are connected to a common control rod 3e, hereinafter called the operating rod. The operating rod 3e is supported for linear and rotary movement relative to the holder unit 2 in such a way that relative to the holder unit it is movable in its longitudinal direction and rotatable about its longitudinal axis. The operating rod 3e is connected in a known manner not here illustrated to a gear lever by means of which the operating rod 3e can be caused to perform linear and rotary movements relative to the holder unit 2. By operating the gear lever between various predetermined positions, the user, e.g. a driver in a motor vehicle, can move the operating rod 3e in its longitudinal direction and place it in any of a plurality predetermined linear positions. For each of the control rods 3a-3d, the operating rod 3e has a predetermined linear position. Depending on its linear position, the operating rod 3e is adapted to being able to move one control rod 3a-3c at a time between these predetermined setting positions by being rotated in a desired direction about its longitudinal axis. The control rods 3a-3c are each provided with control means 9a-9c for cooperation with a corresponding control means 9e of the operating rod 3e. Each control means 9a-9c, 9e is firmly connected to the relating rod 3a-3c, 3e. The control means 9e is thus caused to perform linear and rotary movements together with the operating rod 3e, and each control means 9a-9c will move together with the relating control rod 3a-3c. By movement of the operating rod 3e in its longitudinal direction, its control means 9e can be brought into engagement with one at a time of the control means 9a-9c of the control rods 3a-3c. When the operating rod 3e is in a linear position pertaining to a certain control rod 3a-3c, rotary motion of the operating rod 3e is converted to axial linear movement of the respective control rod via mutual engagement between the operating rod's control means 9e and the control rod's control means 9a-9c.

The setting position of the fourth control rod 3d is in the example illustrated not controlled by the operating rod 3e but may, for example, be adapted to being controlled pneumatically in a conventional manner not further described here.

Each of the control device's control rods 3a-3d is allocated a locking arrangement 20 adapted to defining one or more predetermined setting positions of the control rod 3a-3d relative to the holder unit 2. FIGS. 2a-2c depict part of a control rod 3a with such a locking arrangement 20. The locking arrangement 20 comprises a locking element 21 with a blind hole in it defined by a peripheral wall with an inwardly facing surface provided with one or more grooves or recesses 22a-22c which each define a predetermined setting position of the control rod 3a relative to the holder unit 2. Each groove/recess 22a-22c faces inward towards the control rod 3a. In the example illustrated in FIGS. 2a-2c, the locking arrangement 20 is arranged to define three different setting positions of the control rod 3a relative to the holder unit 2, and in this case the locking arrangement is provided with three grooves/recesses 22a-22c arranged in line consecutively in a direction parallel with the control rod's longitudinal axis. The control rod 3a is arranged for movement relative to the locking element 21. The locking element 21 is with advantage arranged in a bearing 6a which is one of the bearings via which the control rod 3a is fastened to the holder unit 2. In the example illustrated, the locking element 21 takes the form of a separate plate provided at one of its ends with said grooves 22a-22c and fitted in a slit 28 in a sleeve 29. The sleeve 29 has an internal bore 29a in which part of the control rod 3a is slidably accommodated. Alternatively the locking element 21 might be integrated in a sleeve 29 of the type illustrated with respective grooves/recesses 22a-22c formed internally in the sleeve's bore 29a. Other embodiments of the locking element are of course also conceivable.

The locking arrangement 20 further comprises a resilient locking part 23 arranged in a recess 24 in the control rod 3a. This recess 24 is arranged in the control rod's shell surface. The locking part has a locking portion 23a which, against the action of a spring force of the locking part 23, is arranged for movement in said recess 24 in the control rod's radial direction between a protruded position (see FIG. 2a) in which the locking portion 23a engages in one of said grooves/recesses 22a-22c in the locking element and thereby resists linear movement of the control rod 3a relative to the locking element 21 and the holder unit 2, and a retracted position (see FIG. 2b) in which the locking portion 23a does not engage in any of said grooves/recesses in the locking element. Through the action of the spring force of the locking part 23, the locking portion 23a is preloaded to assume its protruded position. The locking portion 23a extends through the outward-facing aperture of the relating recess 24 in the control rod. The locking portion 23a has with advantage a convex shape in side view, as illustrated in FIGS. 2a and 2b.

The locking part 23 is elastically deformable and undergoes elastic deformation when the locking portion 23a moves from the protruded position to the retracted position, as illustrated by FIGS. 2a and 2b. When thereafter the locking portion 23a reverts to the protruded position, the locking part 23 springs back and resumes its original shape.

In the example illustrated, the locking part 23 has two support portions 23b, 23c which are arranged on opposite sides of the locking portion 23a and support the locking portion 23a and via which the locking part 23 abuts against surfaces of the relating recess 24 in the control rod. These support portions 23b, 23c constitute limbs of the locking part 23 which connect to the locking portion 23a situated between them. In the example illustrated, the support portions 23b, 23c rest against a bottom surface 24a of the recess 24. The contact surfaces between the control rod 3a and the support portions 23b, 23c of the locking part constitute mutual slide surfaces which allow mutual sliding between the support portions and the control rod in the control rod's axial direction in response to a change of shape of the locking part 23 when its locking portion 23a moves in either direction between the protruded position and the retracted position. The end directed away from the locking portion 23a of each support portion 23b, 23c in the example illustrated is bent towards the locking portion 23a (upwards in the side view according to FIG. 2a and downwards in the side view according to FIG. 2d) to form a hooklike end section 23b', 23c'. The hooklike end sections 23b', 23c' thus point in the same direction as the locking portion 23a. The hooklike end sections 23b', 23c' are fully accommodated in the recess 24 and each has its outside abutting against the adjacent side surface 24b, 24c at its respective opposite axial end of the recess 24.

The locking 23 part is preferably gullwing-shaped in side view with the locking portion 23a facing downwards, as illustrated in FIG. 2d. The locking part 23 might nevertheless also be of some other suitable shape.

The locking part 23 is advantageously made of metal, preferably steel, and takes with advantage the form of a leaf spring.

The locking part 23 with advantage sits loosely in the relating recess 24 in the control rod and is with advantage prevented from moving in the control rod's longitudinal direction and circumferential direction by abutting against side surfaces of the relating recess 24 in the control rod.

The locking part 23 and the relating recess 24 in the control rod are with advantage elongate and arranged to extend in the control rod's longitudinal direction, as illustrated in FIGS. 2a-2c.

To change from one setting position to another, the control rod 3a has to be moved in its longitudinal direction with such force that the spring force of the locking part 23 is overcome and the locking portion 23a of the locking part is brought out of engagement with the respective groove/recess of the locking element. When thereafter the control rod has been moved far enough for the locking portion 23a to arrive in way of another of the locking element's grooves/recesses 22a-22c, the locking portion 23a will, through the action of the spring force of the locking part 23, move forward to engage with that groove/recess and thereby counteract further movement of the control rod.

Each groove/recess 22a-22c in the locking element has a guide surface 27 adapted to cooperating with the locking portion 23a of the locking part in such a way that the locking portion will, through the action of this guide surface, move from its protruded position to its retracted position in response to a movement of the control rod 3a relative to locking element 21 starting from a setting position of the control rod with the locking portion 23a in engagement with the respective groove/recess 22a-22c. The grooves/recesses 22a-22c together constitute with advantage a substantially sinusoidal profile as seen in longitudinal section through the locking element 21, as illustrated in FIGS. 2a and 2b.

With advantage, the operating rod 3e is also allocated a locking arrangement of the type described above which defines various predetermined setting positions of the operating rod 3e relative to the holder unit 2.

Figure 4:
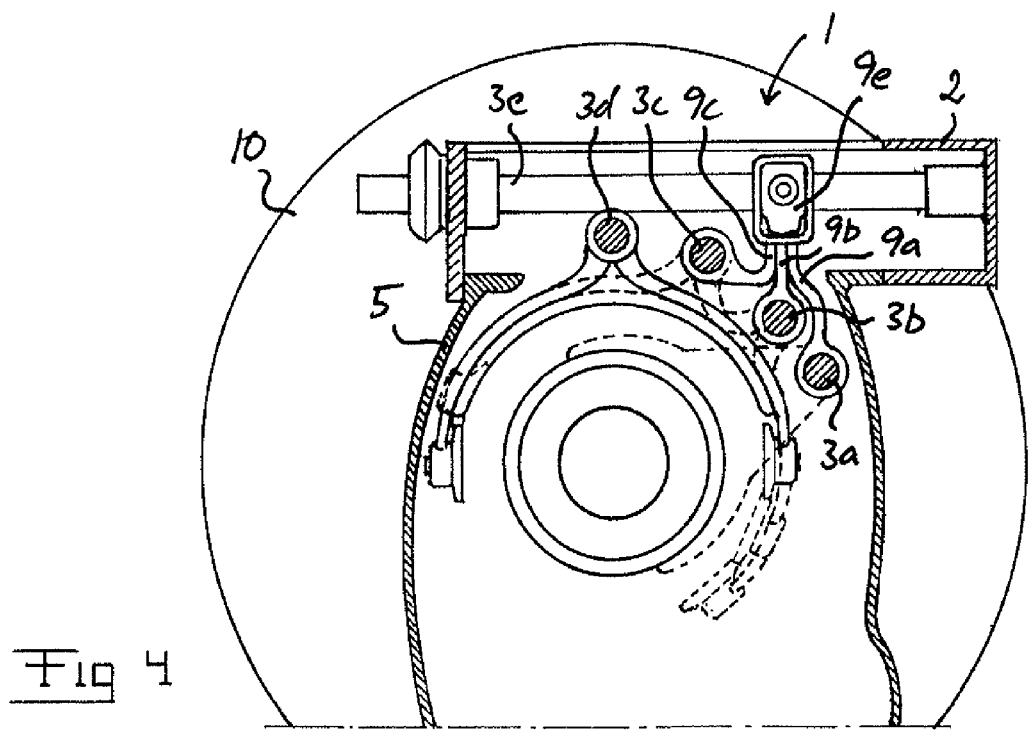
FIG. 4 depicts a schematic partly cutaway view from the rear of the upper portion of a gearbox provided with a control device according to the present invention.

The control device 1 according to the invention is particularly intended to form part of a manual gearbox for a motor vehicle. Part of such a gearbox 10 is illustrated schematically in FIG. 4.

The invention is of course in no way limited to the embodiments described above, since a multiplicity of possibilities for modifications thereof are likely to be obvious to a specialist in the field without thereby having to deviate from the basic concept of the invention as defined in the attached claims.

The invention claimed is:

1. A control device for controlling engagement of a selected gear of a gearbox, the control device comprising
    a holder unit, at least one control rod, the control rod is arranged and operable for linear movement in the holder unit, and
    a locking arrangement operable to cooperate with the control rod, the locking arrangement is configured to define one or more predetermined setting positions of the control rod relative to the holder unit,
    the locking arrangement comprising:
    the holder unit including a locking element having a hollow interior defined by a peripheral wall in which one or more grooves or recesses are formed at intervals along the peripheral wall, and each groove or recess defines a predetermined setting position of the control rod relative to the holder unit along the linear movement of the control rod relative to the locking element; and
    a recess in the control rod
    a resilient locking part comprised of a leaf spring, the locking part being arranged in the recess in the control rod, the locking part has a locking portion which, against the action of a spring force of the locking part is arranged and positioned for movement in the recess and in the control rod's radial direction between a protruded position in which the locking portion engages in one of the grooves/recesses in the locking element and thereby resists movement of the control rod relative to the locking element, and a retracted position in which the locking portion does not engage in any of the grooves/recesses in the locking element.

2. A control device according to claim 1, wherein the locking part and the relating recess in the control rod are elongate and arranged to extend in the control rod's longitudinal direction.

3. A control device according to claim 1, wherein the locking part is gullwing-shaped in a side view with the locking portion thereof facing downwards.

4. A control device according to claim 1, wherein the locking part abuts against side surfaces of the relating recess in the control rod for preventing the locking part from moving in the control rod's longitudinal direction and circumferential direction.

5. A control device according to claim 1, wherein the locking portion is of convex shape in side view.

6. A control device according to claim 1, wherein each groove/recess in the locking element of the holding unit has a guide surface arranged to cooperate with the locking portion of the locking part in such a way that, through action of that guide surface the locking portion moves from its protruded position to its retracted position in response to a movement of the control rod relative to the locking element starting from a setting position of the control rod with the locking portion engaged in the respective groove/recess.

7. A gearbox for a motor vehicle comprising a plurality of selectable operating gears for vehicle operation;
   at least one of the control rods being operable for controlling selection of gears in the gearbox, and
   a control device according to claim 1.

8. A control device for controlling engagement of a selected gear of a gearbox, the control device comprising
   a holder unit, at least one control rod, the control rod is arranged and operable for linear movement in the holder unit, and
   a locking arrangement operable to cooperate with the control rod, the locking arrangement is configured to define one or more predetermined setting positions of the control rod relative to the holder unit,
   the locking arrangement comprising:
   the holder unit including a locking element having a hollow interior defined by a peripheral wall in which one or more grooves or recesses are formed at intervals along the peripheral wall, and each groove or recess defines a predetermined setting position of the control rod relative to the holder unit along the linear movement of the control rod relative to the locking element and;
   a recess in the control rod
   a resilient locking part arranged in the recess in the control rod, the locking part has a locking portion which, against the action of a spring force of the locking part is arranged and positioned for movement in the recess and in the control rod's radial direction between a protruded position in which the locking portion engages in one of the grooves/recesses in the locking element and thereby resists movement of the control rod relative to the locking element, and a retracted position in which the locking portion does not engage in any of the grooves/recesses in the locking element;
   the locking part having two support portions which are arranged on longitudinally opposite sides of the locking portion and are operable to support the locking portion and via which the locking part abuts against surfaces of the relating recess in the control rod.

9. A control device according to claim 8, further comprising the end of each supporting portion directed away from the locking portion of each supporting portion is bent to form a hooklike end section.

* * * * *